(12) United States Patent
Markel

(10) Patent No.: US 9,211,818 B2
(45) Date of Patent: Dec. 15, 2015

(54) VEHICLE SEAT HAVING A FLOOR POSITION

(71) Applicant: Johnson Controls Components GmbH & Co. KG, Kaiserslautern (DE)

(72) Inventor: Christian Markel, Alzey (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 14/406,349

(22) PCT Filed: Jun. 21, 2013

(86) PCT No.: PCT/EP2013/062965
§ 371 (c)(1),
(2) Date: Dec. 8, 2014

(87) PCT Pub. No.: WO2014/001209
PCT Pub. Date: Jan. 3, 2014

(65) Prior Publication Data
US 2015/0137549 A1 May 21, 2015

(30) Foreign Application Priority Data

Jun. 26, 2012 (DE) .......................... 10 2012 012 851
Aug. 23, 2012 (DE) .......................... 10 2012 016 918

(51) Int. Cl.
*B60N 2/36* (2006.01)
*B60N 2/30* (2006.01)
(Continued)

(52) U.S. Cl.
CPC .............. *B60N 2/309* (2013.01); *B60N 2/0292* (2013.01); *B60N 2/045* (2013.01); *B60N 2/2887* (2013.01); *B60N 2/2893* (2013.01); *B60N 2/305* (2013.01);
(Continued)

(58) Field of Classification Search
CPC .................................. B60N 2/309; B60N 2/68
USPC ............................................... 296/65.01, 68.1
See application file for complete search history.

(56) References Cited

U.S. PATENT DOCUMENTS 5,918,934 A * 7/1999 Siegrist ................ B60N 2/2821
296/64
7,178,873 B2 * 2/2007 Foelster ............... B60N 2/2893
297/253

(Continued)

FOREIGN PATENT DOCUMENTS

DE 101 56 644 C2 10/2003
DE 103 31 611 A1 2/2005
(Continued)

*Primary Examiner* — Pinel Romain
(74) *Attorney, Agent, or Firm* — McGlew and Tuttle, P.C.

(57) ABSTRACT

A vehicle seat, including a substructure and a backrest articulated on the substructure, can be transferred from a sitting position to a floor position by folding the backrest forward. A first rocker and second rocker, on the two outer seat faces, articulate the backrest on the substructure. The substructure, the first rocker, the backrest, and the second rocker form a four-bar linkage. Each of the second rockers is rotatably connected to the substructure by a respective second joint and to the backrest by a respective third joint. A transverse tube extends in the transverse vehicle direction between the two second rockers. The transverse tube has two ends, each of which is fastened to the associated second rocker in an area between the second joint and the third joint of the respective four-bar linkage. At least one connection point of a child seat fastening system is provided on the transverse tube.

15 Claims, 5 Drawing Sheets

(51) Int. Cl.
*B60N 2/28* (2006.01)
*B60N 2/02* (2006.01)
*B60N 2/04* (2006.01)

(52) U.S. Cl.
CPC ............ *B60N 2/3013* (2013.01); *B60N 2/3031* (2013.01); *B60N 2/3065* (2013.01); *B60N 2/3088* (2013.01); *B60N 2/36* (2013.01)

(56) References Cited

U.S. PATENT DOCUMENTS

2007/0108832 A1    5/2007    Lentz
2010/0156165 A1    6/2010    Vais
2013/0214576 A1*   8/2013    Hoshi .................. B60N 2/1615
                                                    297/311
2014/0239684 A1*   8/2014    Mindel ................ B60N 2/2824
                                                    297/216.18

FOREIGN PATENT DOCUMENTS

DE    10 2004 004376 B3    10/2005
EP    0 626 290 B1         7/1998
JP    2002 211 287 A       7/2002
JP    2010 100 229 A       5/2010

* cited by examiner

VEHICLE SEAT HAVING A FLOOR POSITION

CROSS REFERENCE TO RELATED APPLICATIONS

This application is a United States National Phase application of International Application PCT/EP2013/062965 filed Jun. 21, 2013 and claims the benefit of priority under 35 U.S.C. §119 of German Patent Applications DE 10 2012 012 851.7 filed Jun. 26, 2012 and DE 10 2012 016 918.3 filed Aug. 23, 2012, the entire contents of which are incorporated herein by reference.

FIELD OF THE INVENTION

The invention relates to a vehicle seat vehicle seat, in particular motor vehicle seat, with a substructure and a backrest which is attached to the substructure in an articulated manner, wherein the vehicle seat is transferable from a seat position into a floor position by folding the backrest forward, and a respective first rocker and a respective second rocker are provided on the two outer sides of the seat in order to couple the backrest to the substructure, wherein the substructure, the respective first rocker, the backrest and the respective second rocker as four gearing or link members, which are connected to one another via joints in each case define a four-bar linkage.

BACKGROUND OF THE INVENTION

EP 0 626 290 B1 discloses a vehicle seat of the type in question, with a substructure and a backrest which is attached in an articulated manner to the substructure, wherein the vehicle seat is transferable from a seat position into a floor position by folding the backrest forward, and a respective first rocker and a respective second rocker are provided on the two outer sides of the seat in order to couple the backrest to the substructure, wherein the substructure, the first rocker, the backrest and the second rocker as four gearing members which are connected to one another via joints define a four-bar linkage. This vehicle seat does not have a child seat fastening system which can be used independently of the vehicle belt system. Such child seat fastening systems are known, for example, by the name ISOFIX and, on the vehicle-seat side, comprise two lower attachment points which are arranged at a distance of 280 mm from each other in the transition region between seat cushion and seat back. Latch systems of the child seat fastening system, also referred to as connectors, are fastened to said two lower attachment points. The child seat fastening system optionally additionally comprises a third attachment point for fastening what is referred to as a top tether belt strap of the child seat. The child seat which is placed onto the vehicle seat is fastened to the ISOFIX attachment points without using the vehicle belt system. In particular, the permissible position of the attachment points of the ISOFIX system is standardized by the standard ISO 13216.

DE 101 56 644 C2 likewise discloses a vehicle seat with a four-bar-linkage attachment of a backrest to a substructure. However, a child seat fastening system is not provided for this vehicle seat, and therefore this vehicle seat is suitable only to a limited extend for transporting children, namely only in combination with child seats which can be used with the vehicle belt system.

DE 10 2004 004 376 B3 discloses a cross piece which receives a child seat fastening system and is fixably connected to the substructure of a vehicle seat via a lower part of a backrest fitting. Such an attachment cannot simply be transferred to vehicle seats which do not have a backrest fitting or the backrest fittings of which are located significantly above the attachment points of the child seat fastening system. This is frequently the case in vehicle seats, the backrest of which is attached in an articulated manner to a substructure via a four-bar linkage.

JP 2010 100 229 A discloses a transverse tube which runs between body work adapters of a backrest and on which attachment points of a child seat fastening system are provided.

SUMMARY OF THE INVENTION

The invention is based on an object of providing a universal child seat fastening system for a vehicle seat of the type mentioned at the beginning and of integrating said child seat fastening system in the seat structure in such a manner that the latter is subjected to the lowest possible loading in the event of a crash.

Owing to the fact that a transverse tube runs in the transverse vehicle direction between the two second rockers, the transverse tube has two ends, and each of said two ends is fastened to the associated second rocker in each case in a region between the second joint and the third joint, wherein at least one attachment point of a child seat fastening system is provided on the transverse tube, the crash force acting on the child seat in the event of a crash is directly introduced into the substructure of the vehicle seat via the second rockers and subjects the backrest and the locking of the four-bar linkage of the vehicle seat to only a small load, if any at all.

Two lower attachment points of an ISOFIX child seat fastening system are preferably provided on the transverse tube in order to be able to connect the vehicle seat to a standardized ISOFIX child seat. A particularly cost-effective solution is provided if the two lower attachment points are designed as substantially U-shaped clips, in particular made from bent wire. Each of said two lower clips then preferably comprises a connector receiving section which runs parallel to the transverse vehicle direction y and is connected by means of two arm sections to two in particular circular-arc-shaped end sections which are fastened to the transverse tube. The circular-arc-shaped end sections here are ideally designed in such a manner that they engage around the transverse tube in a form-fitting manner and thereby oppose release when subjected to a load.

A third attachment point, in particular for a top tether of an ISOFIX child seat fastening system, can additionally be provided on the transverse tube. By fastening the third attachment point to the transverse tube, the backrest structure in particular is relieved of the load from the forces of the top tether attachment. The third attachment point is preferably designed cost-effectively as a third, substantially U-shaped, clip, in particular made from bent wire.

With regard to the strength of the vehicle seat, a transverse tube with two ends which are fastened to in each case one of the two second rockers in each case in a region between a second joint and a third joint of the four-bar linkage, has proven preferable. It is particularly advantageous if the second joint rotatably connects the substructure to the second rocker and the third joint rotatably connects the backrest to the second rocker, and, in particular, each of the two ends of the transverse tube is fastened to the two second rockers in each case on a connecting line between the second joint and the third joint of the four-bar linkage.

A very cost-effective and weight-optimized design makes provision for each of the two ends of the transverse tube to be welded directly to one of the two second rockers. Additional adapter parts can thereby be omitted.

A circular cross section of the transverse tube permits a cost-effective use of a semi-finished product as the transverse tube. However, the invention is not restricted to a certain cross section. For strength reasons, open or closed profiles with a particularly flexurally rigid and/or torsion-proof profile cross section can also be used. The term transverse tube should therefore be understood as meaning all tubes and profiles which are known per se in the vehicle seat sector.

The solution according to the invention with the above-mentioned advantages can also be used in vehicle seats of the generic type which, in addition to the four-bar linkage, have a third rocker which is attached in an articulated manner to the substructure in the front region thereof by means of a lower joint and which is attached in an articulated manner to a seat cushion by means of an upper joint, wherein the seat cushion is lockable to the first rocker in the seat position by means of a locking device.

The present invention shall be explained in more detail on the basis of the following figures and exemplary embodiments, without the present invention being limited to these. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

In the first exemplary embodiment (FIG. 1 to FIG. 5), a vehicle seat 1 of a rear row of seats of a motor vehicle has a substructure 3 (not illustrated in detail in the Figures). The substructure 3 is connected in a manner not illustrated specifically to the vehicle structure of the motor vehicle, for example is screwed thereto, and, in a manner described below, bears a seat cushion 5 and a backrest 7. The vehicle seat 1 is transferable, by folding the seat cushion 5 and the backrest 7 forward, from a seat position (illustrated in FIG. 1) in which the seat can be occupied and with a substantially upright backrest 7 into a flat floor position (illustrated in FIG. 3), in which a planar loading surface, referred to below as loading floor plane, is available with an increased loading space volume.

The orientation of the vehicle seat 1 within the motor vehicle and the customary direction of travel thereof define the directional details of a Cartesian vehicle coordinate system, which has three directions x, y and z, that are used below. A horizontally oriented longitudinal vehicle direction x runs parallel to the conventional direction of travel of the vehicle. A likewise horizontally oriented transverse vehicle direction y defines a direction running perpendicularly to the longitudinal vehicle direction x. A vertical vehicle axis z is perpendicular to the directions x and y and is oriented upward (away from the carriageway). The origin of the coordinate system is located—as seen in the transverse vehicle direction y—in the vehicle center. The details "on the right" and "on the left" relate to a viewing direction in the longitudinal vehicle direction x, i.e. in the direction of travel. The details "upward" and "downward" also enclose angles of up to 45 to the vertical vehicle axis z.

The two sides of the vehicle seat 1 are of mirror-inverted design with respect to a seat center plane which, as seen in the transverse vehicle direction y, runs through the seat center parallel to an x-z plane defined by the longitudinal vehicle direction x and the vertical vehicle axis z. In the following, only the left side of the vehicle seat 1 is described, the kinematic joints of which are in each case present on both sides and in each case form axes of rotation—running parallel to the transverse vehicle direction y. The rotations, which are described below, about individual joints therefore correspond to rotations about the axis of rotation formed in each case by the left joint and the associated right joint.

Figure 1:
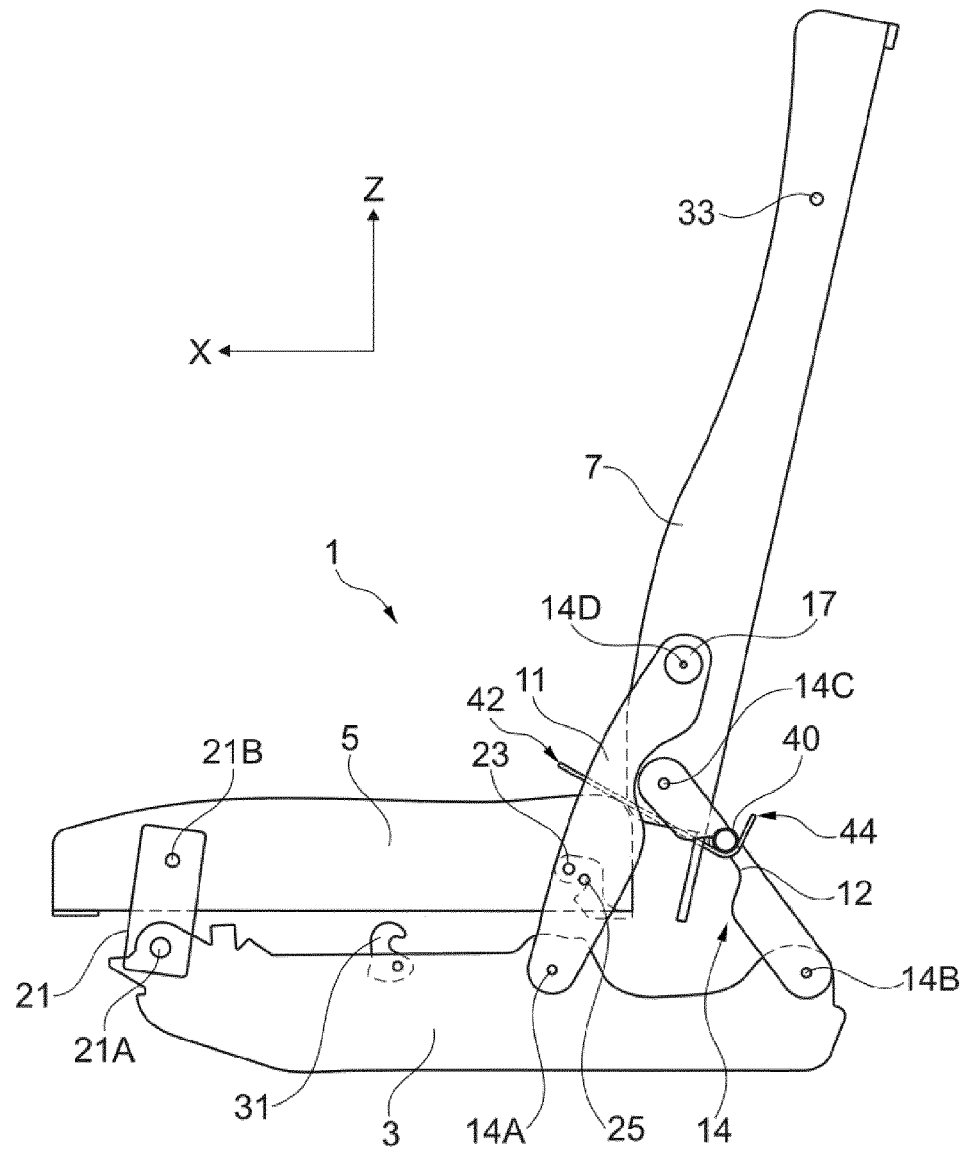
FIG. 1 is a side view of the first exemplary embodiment in the seat position.

As illustrated in FIG. 1, a first rocker 11 is attached in an articulated manner to the rear end of the substructure 3 by means of a first joint 14A and, behind said rocker counter to the direction of travel, a second rocker 12 is attached in an articulated manner, in each case at one end of the rocker, to the rear end of the substructure 3 by means of a second joint 14B. The first rocker 11 and the second rocker 12 are attached in an articulated manner in each case by the second and thereof to the backrest 7, more precisely to the structure thereof, by means of a third and fourth joint 14C, 14D. The fourth joint 14D is designed as a lockable fitting 17, in the present case as a latching fitting. The substructure 3, the two rockers 11 and 12 and the backrest 7 define, with the respective joints 14A, 14B, 14C, 14D, a four-bar linkage 14, i.e. the backrest 7 is attached in an articulated manner to the substructure 3 by means of said four-bar linkage 14.

A third rocker 21 is attached in an articulated manner to the front end of the substructure 3 at one of two ends of the third rocker 21 by means of a lower joint 21A. The third rocker 21 is attached by its second end to the seat cushion 5 by means of an upper joint 21B, or more precisely to the support structure of said seat cushion. A first locking device 23 is attached to the rear end of the seat cushion 5, said locking device, in the seat position, receiving a first bolt 25 protruding laterally from the first rocker 11. The seat cushion 5 is thereby locked to the four-bar linkage 14 in the seat position.

Figure 2:
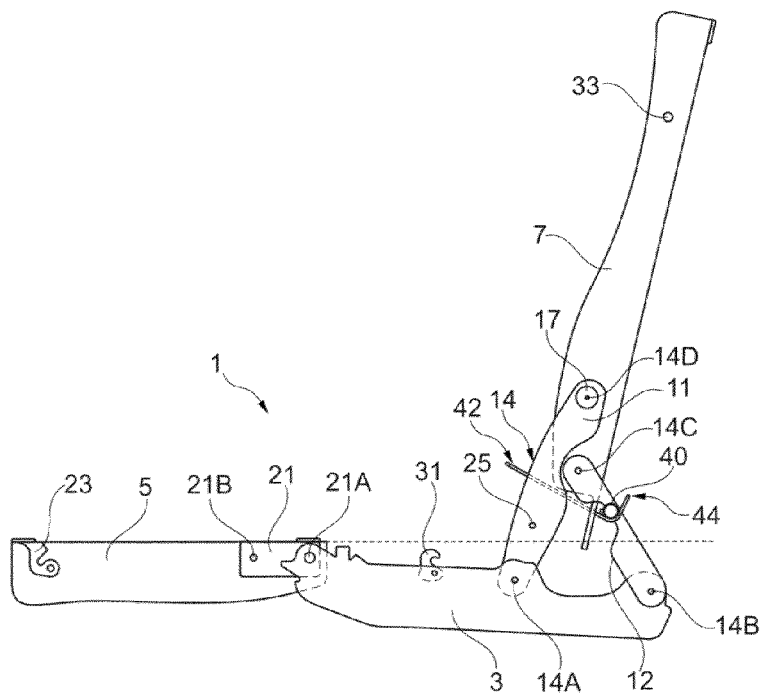
FIG. 2 is a side view of the first exemplary embodiment in an intermediate position.
Figure 3:
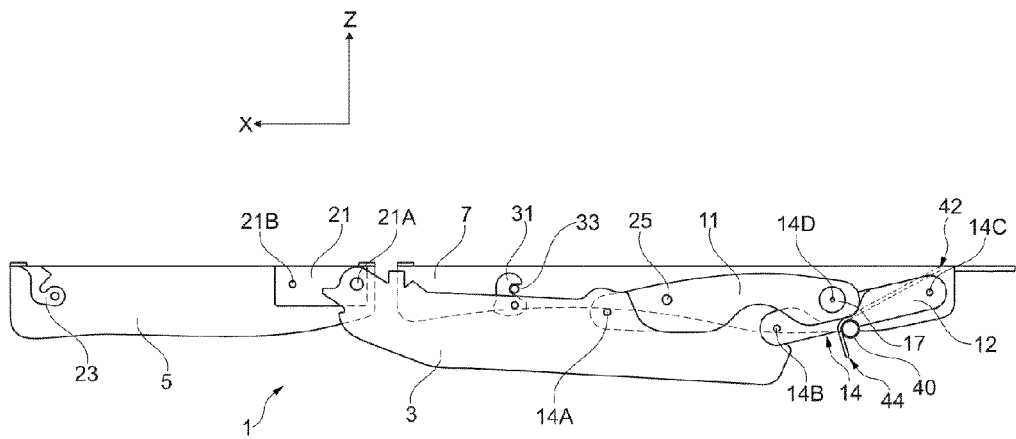
FIG. 3 is a side view of the first exemplary embodiment in the floor position.
Figure 4:
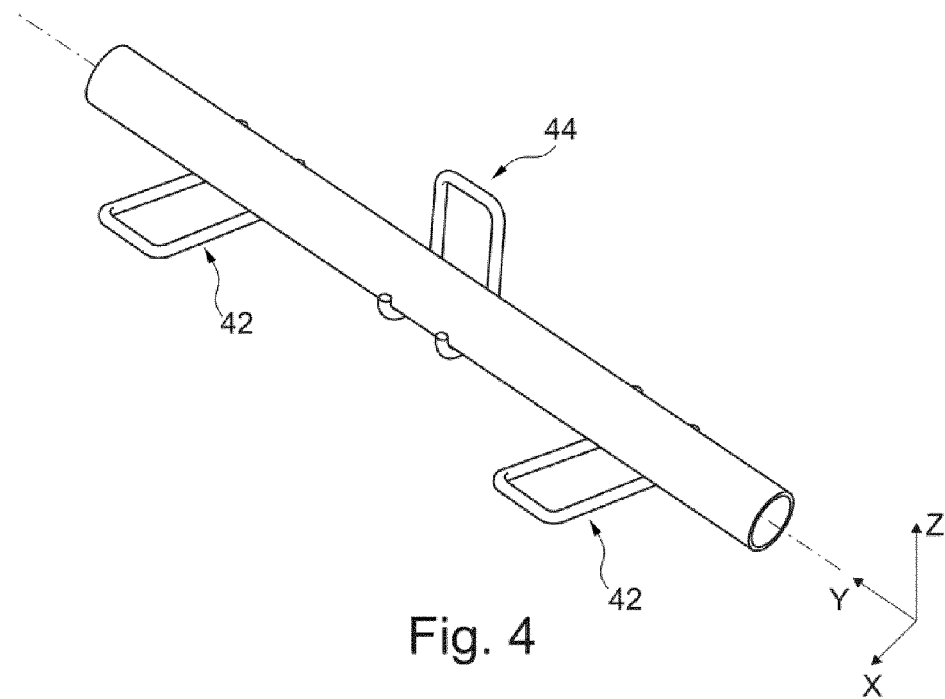
FIG. 4 is a perspective view of the transverse tube with the two lower attachment points and the third attachment point.
Figure 5:
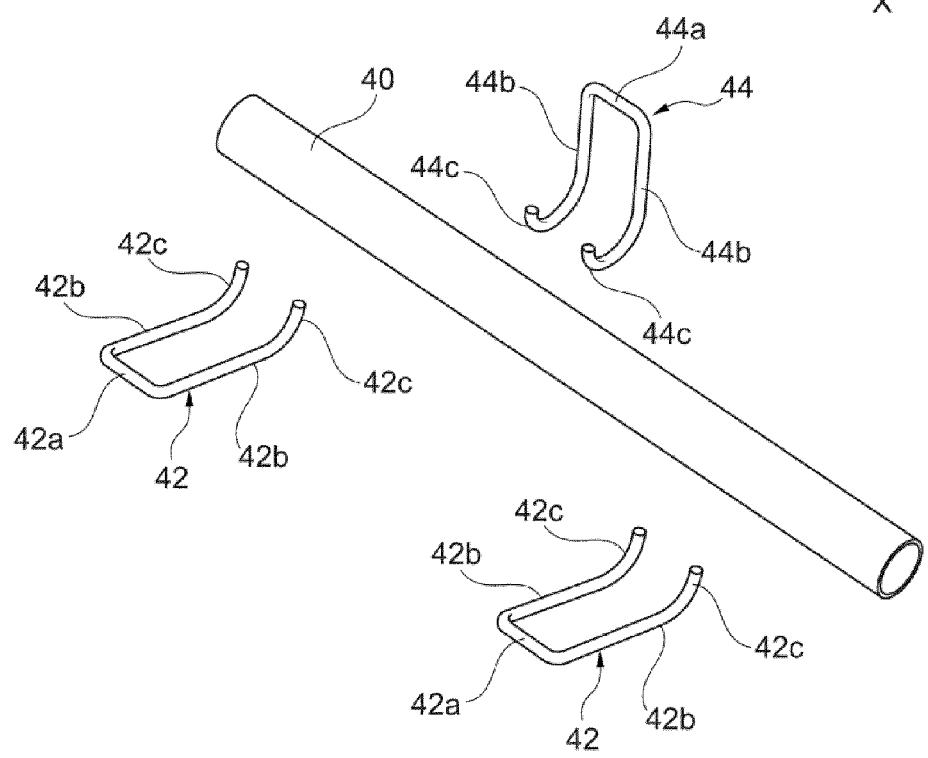
FIG. 5 is a view corresponding to FIG. 4 in an exploded illustration.

For the transition into the floor position, first of all the first locking device 23 is opened. The seat cushion 5 is subsequently folded forward by a total of approximately 180 by means of rotation of the third rocker 21 about the lower joint 21A and rotation of the seat cushion 5 about the upper joint 21B, until the firm lower side of the seat cushion 5 points upward, as illustrated in FIGS. 2 and 3. The folding over of the seat cushion 5 may be spring-assisted.

By opening the latching fitting 17, the four-bar linkage 14 can be unlocked, and therefore the backrest 7 can likewise be folded forward until the firm rear side thereof points upward, as illustrated in FIG. 3. In the process, the first rocker 11 pivots rearward about the first joint 14A and the second rocker 12 pivots rearward about the second joint 14B. The first bolt 25, which was still located above the loading floor plane (sketched by dashed lines) in the intermediate position of FIG. 2, is now located below said loading floor plane defined by the hard rear side of the backrest 7. A second locking device 31 provided on the substructure 3 receives a second bolt 33 which protrudes laterally from the end region—the upper region in the seat position—of the backrest 7. The seat cushion 5 rests, for example, on the vehicle structure or is locked to the latter by means of the first locking device 23. The backrest 7 can be secured in the flat floor position by closing of the latching fitting 17.

For the return into the seat position, first of all the four-bar linkage 14 and therefore the backrest 7 are released by opening of the latching fitting 17 such that said backrest can be pivoted into its starting position. The latching fitting 17 is locked again there. The seat cushion 5 can then be folded back.

A further type of operation with rapid folding is possible in the case of the vehicle seat 1. For this purpose, the first locking device 23 is left locked, and therefore the seat cushion 5 remains locked to the four-bar linkage 14. As during the transition into the floor position, the latching fitting 17 is opened and the backrest 7 folded forward. In the process, the seat cushion 5 is pulled rearward and downward by the four-bar linkage 14, as a result of which the backrest 7 comes to lie on the seat cushion 5. However, this end position is not as flat as the floor position. The return into the seat position takes place in a reverse sequence of the described steps.

The latching fitting 17 furthermore permits an adjustment of the inclination of the backrest 7 to increase the seat comfort by the inclination being able to be individually adapted to the occupant's requirements. For this purpose, as previously described, the latching fitting 17 is opened, and then the inclination of the backrest 7 is adjusted, for example by pulling on the upper backrest head, and finally the latching fitting 17 is locked again. An adjustment of the entire four-bar linkage that inevitably results therewith is not of disadvantage here.

A transverse tube 40 serving for the attachment of a child seat fastening system runs in the transverse vehicle direction between the two second rockers 12. Each of the two ends of the transverse tube 40 is in each case attached, in particular welded, to one of the two second rockers 12, in the present case between the second joint 14B and the third joint 14C. In the present case, the transverse tube 40 has a circular cross section, but may also have any other cross section, for example a cross section optimized with regard to high flexural rigidity.

In a manner known per se, a respective lower clip 42 as a lower attachment point of an ISOFIX child seat fastening system is attached to the transverse tube 40 in the two outer regions of the seat. Each of the two lower clips 42 comprises a connector receiving section 42a which is oriented parallel to the transverse vehicle direction y and on which a connector of a child seat can be fastened. The connector receiving section 42a, which is spaced apart from the transverse tube 40 and runs linearly, merges at its two ends into a respective arm section 42b which preferably is oriented perpendicularly to the transverse vehicle direction y and runs linearly. A circular-arc-shaped radius, in particular bending radius, is preferably provided in the transition region between the connector receiving section 42a and the arm section 42b. A circular-arc-shaped end section 42c is connected to that end of each arm section 42b which faces away from the connector receiving section 42a. The inner radius of the end section 42c is approximately identical in size to the outer diameter of the transverse tube 40. The end section 42c bears with its inner radius against the transverse tube 40 and is fastened thereto, in particular is welded thereto.

In the seat position, the two lower clips 42 protrude through a pad gap between the seat cushion 5 and the pad of the backrest 7. During the transition into the floor position, the two lower clips 42 are pulled out of the pad gap and pivot together with the second rockers 12.

Approximately in the center of the vehicle seat 1, and therefore approximately in the center of the transverse tube 40, as seen in the transverse vehicle direction y, a third attachment point 44 is attached to the transverse tube 40, in particular a top tether attachment point of the ISOFIX child seat fastening system. The third attachment point 44 is likewise designed as a (third) clip and has a first clip section 44a for interaction with a top tether of a child seat, and also two second clip sections 44b and two third clip sections 44c. The geometrical design of the third clip 44 corresponds to the geometrical design of the lower clip 42 (of the lower attachment points), wherein the first clip section 44a corresponds to the connector receiving section 42a, the second clip section 44b corresponds to the arm section 42b and the third clip section 44c corresponds to the end section 42c. The third clip 44 and the lower clips 42 are preferably identical parts or merely the lengths of individual sections differ.

The third clip 44 is fastened to the transverse tube 40 in a manner rotated about the longitudinal axis of the transverse tube 40 in relation to the two lower clips 42, and therefore the first clip section 44a is positioned and is accessible behind the backrest 7, as seen in the driving direction.

The lower clips 42 and the third clip 44 are preferably composed of a bent steel material wire which is cut to size. In a preferred embodiment, the diameter is 6 mm. However, the clips 42 and 44 can also be composed of different materials and/or can be produced by means of other semi-finished products and manufacturing methods.

Owing to the attachment of the two lower attachment points (clips) 42 and of the third attachment point (clip) 44 to the transverse tube 40, crash loads are introduced via the transverse tube 40 directly into the second rockers 12 and are conducted further via the second rockers 12 into the substructure 3. As a result, the crash loads are not guided via the backrest 7 and subject the fitting 17 only to a small load. This effect is substantially independent of the geometry of the lower attachment points 42 or of the third attachment point 44.

In a modification of the first exemplary embodiment, the fitting 17 is designed as an eccentric epicyclic gearing which is also known to a person skilled in the art by the term wobble gearing. The four-bar linkage 14 is then adjusted between the seat position and the floor position by the fitting 17 being adjusted in a manner known per se by rotation at a hand wheel or by an electric motor.

Figure 6:
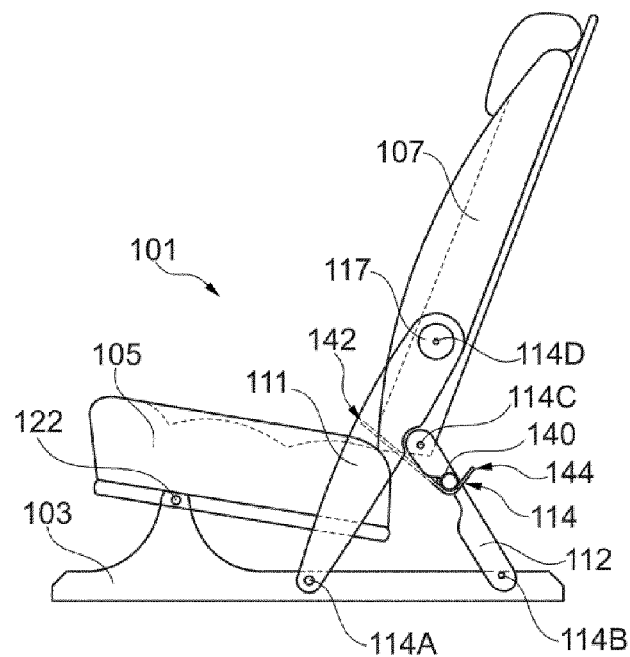
FIG. 6 is a side view of the second exemplary embodiment in the seat position.
Figure 7:
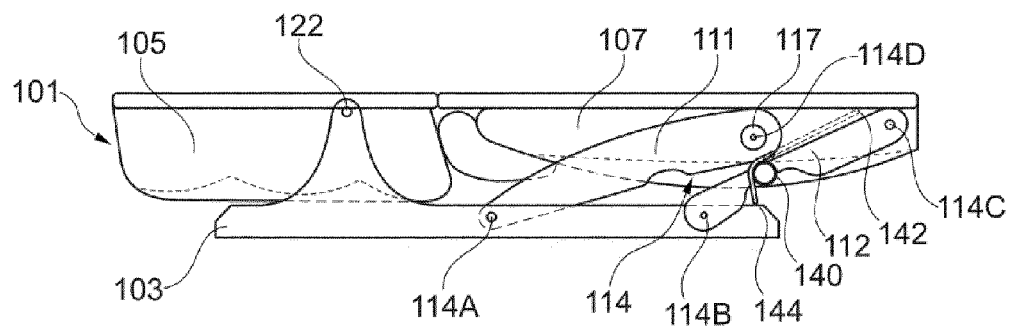
FIG. 7 is a side view of the second exemplary embodiment in the floor position.

The second exemplary embodiment (FIGS. 6 and 7) substantially corresponds to the first exemplary embodiment apart from the details described below, and therefore components which are identical and act to like effect bear reference numbers incremented by 100. In the case of this vehicle seat 101, the substructure 103 likewise supports the seat cushion 105 and the backrest 107. The first rocker 111 and the second rocker 112 are attached in an articulated manner to the substructure 103 and to the backrest 107 likewise with the formation of a four-bar linkage 114. A fitting 117, in particular a latching fitting or geared fitting, forms the fourth joint 114D here between backrest 107 and first rocker 111. The four-bar linkage 114 is thereby blocked, and the backrest 107 is held securely. The seat cushion 105 is attached in an articulated manner to a raised material portion of the substructure 103 by means of a joint 122 arranged in the front third of said seat cushion.

For the transition into the floor position, the seat cushion 105 is folded forward by approximately 180 about the joint 122 and the fitting 117 is then unlocked. The backrest 107 can then likewise be folded forward, wherein, when the floor position is reached, the backrest 107 comes to lie on the second rocker 112 and is supported by the latter, i.e. the loading floor load of the backrest 107 is at least partially absorbed by the second rocker 112. The return into the seat position takes place in a reverse sequence. The further manner of operation mentioned in the first exemplary embodiment is also possible in the second exemplary embodiment.

The second exemplary embodiment also has a transverse tube 140 which serves for attaching a child seat fastening system and runs between the two second rockers 112 parallel to the transverse vehicle direction y. Each of the two ends of the transverse tube 140 is in each case attached, in the present case welded, to one of the two second rockers 112, in particular between the second joint 114B and the third joint 114C. In the present case, the transverse tube 140 has a circular cross section, but may also have any other cross section.

In a manner known per se, a respective lower clip 142 as the lower attachment point of an ISOFIX child seat fastening system is attached to the transverse tube 140 in the two outer regions of the seat. A third clip 144, in particular a top tether attachment point of the ISOFIX child seat fastening system, is attached in the tube center. The design of the lower clips 142 and of the third clip 144 corresponds to the design of the respective clips of the first exemplary embodiment.

In modifications of the first and second exemplary embodiments, the fitting does not form the fourth joint, but rather the third joint of the four-bar linkage, by means of which the rear rocker is attached in an articulated manner to the backrest. The manner of operation with respect to the adjustment of the inclination of the backrest and the adopting of the floor position corresponds.

Figure 8A:
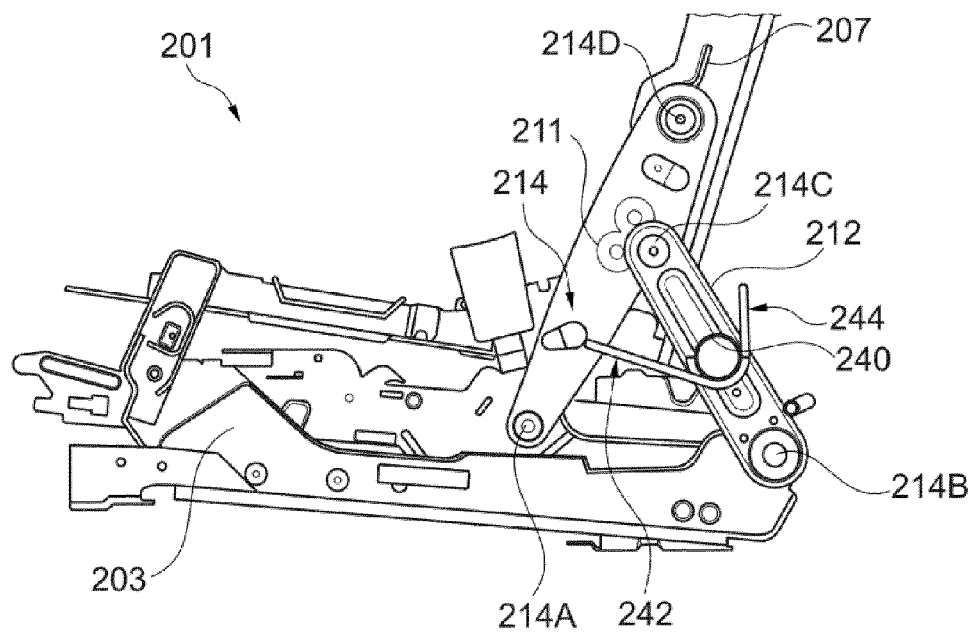
FIG. 8a is a side view of the third exemplary embodiment in the seat position.
Figure 8B:
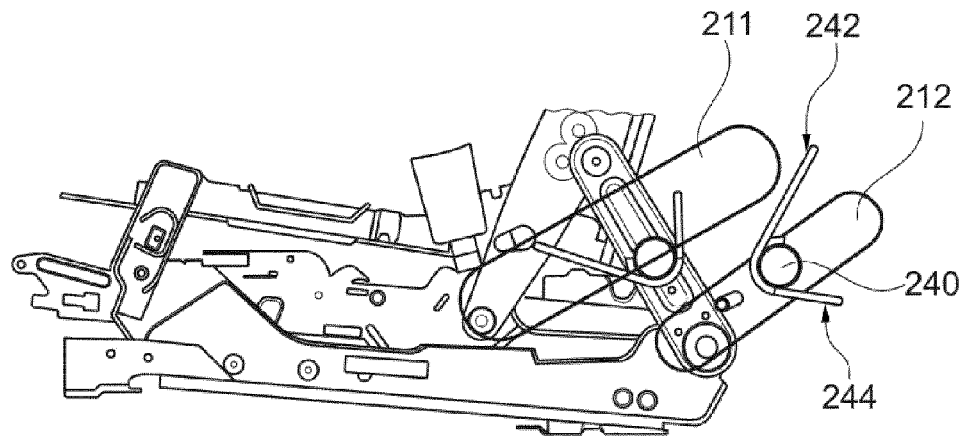
FIG. 8b is a side view corresponding to FIG. 8a with a position of the first and second rocker in a floor position, illustrated in schematized form.

The third exemplary embodiment (FIGS. 8*a* and 8*b*) substantially corresponds to the first exemplary embodiment apart from the details described below, and therefore components which are identical and act to like effect bear reference numbers incremented by 200. In the case of this vehicle seat 201, the four-bar linkage 214 is not locked in the seat position via a fitting arranged in a joint (214A, 214B, 214C, 214D), but rather by means of a rotary latch lock (not illustrated) which acts between the first rocker 211 and the second rocker 212. For this purpose, the rotary latch lock is fastened to the first rocker 211 and, in a manner known per se, receives a counter element fastened to the second rocker 212—in the present case a locking shackle—in the rotary latch in a form-fitting manner. In order to unlock the seat position, the rotary latch lock is unlocked and the counter element can leave the rotary latch.

The third exemplary embodiment also has a transverse tube 240 which serves for the attachment of a child seat fastening system and runs between the two second rockers 212 parallel to the transverse vehicle direction y. Each of the two ends of the transverse tube 240 is attached, in the present case welded, in each case to one of the two second rockers 212 between the second joint 214B and the third joint 214C. In the present case, the transverse tube 240 has a circular cross section, but may also have any other cross section.

In a manner know per se, a respective lower clip 242 as the lower attachment point of an ISOFIX child seat fastening system is attached to the transverse tube 240 in the two outer regions of the seat. A third clip 244 as the third attachment point, in particular a top tether attachment point of the ISOFIX child seat fastening system, is attached in the tube center. The design of the lower clips 242 and of the third clip 244 corresponds to the design of the respective clips of the first exemplary embodiment.

The features disclosed in the above description, the claims and the drawings may be of importance both individually and in any combination for realizing the invention in its various refinements.

While specific embodiments of the invention have been shown and described in detail to illustrate the application of the principles of the invention, it will be understood that the invention may be embodied otherwise without departing from such principles.

The invention claimed is:

1. A motor vehicle seat comprising:
    a substructure;
    a backrest;
    a first rocker provided respectively on each of two outer sides of the seat in order to couple the backrest to the substructure in an articulated manner;
    a second rocker provided respectively on each of the two outer sides of the seat in order to couple the backrest to the substructure in an articulated manner, wherein the vehicle seat is transferable from a seat position into a floor position by folding the backrest forward;
    a transverse tube that runs in a transverse vehicle direction between the two second rockers, wherein:
    each of the two first rockers are attached in an articulated manner to the substructure by means of a respective first joint and are connected in an articulated manner to the backrest by means of a respective joint;
    each of the two second rockers are connected in an articulated manner to the substructure by means of a respective second joint and are connected in an articulated manner to the backrest by means of a respective third joint;
    the transverse tube has two ends, and each of said two ends is fastened to the associated second rocker in each case in a region between the second joint and a third joint, wherein at least one attachment point of a child seat fastening system is provided on the transverse tube; and
    the substructure, the respective first rocker, the backrest and the respective second rocker are connected to one another via the joints to define a four-bar linkage.

2. The vehicle seat as claimed in claim 1, wherein the least one attachment point of a child seat fastening system comprises two lower attachment points of an ISOFIX child seat fastening system that are provided on the transverse tube.

3. The vehicle seat as claimed in claim 2, wherein the two lower attachment points comprise substantially U-shaped lower clips.

4. The vehicle seat as claimed in claim 2, wherein two lower attachment points comprise lower clips made from bent wire.

5. The vehicle seat as claimed in claim 4, wherein each of the two lower clips comprises a connector receiving section running parallel to the transverse vehicle direction, two arm sections connected to the connector receiving section and two end sections connected in each case to one of the arm sections, and the end sections are fastened to the transverse tube.

6. The vehicle seat as claimed in claim 5, wherein at least one of the arm sections is of circular-arc-shaped design and engages around the transverse tube at least partially in a form-fitting manner.

7. The vehicle seat as claimed in claim 2, wherein the least one attachment point of a child seat fastening system further comprises a third attachment point provided on the transverse tube.

8. The vehicle seat as claimed in claim 7, wherein the third attachment point is provided for a top tether fastening of an ISOFIX child seat fastening system.

9. The vehicle seat as claimed in claim 8, wherein the third attachment point comprises a substantially U-shaped third clip.

10. The vehicle seat as claimed in claim 9, wherein the third clip is formed from bent wire.

11. The vehicle seat as claimed in claim 1, wherein each of the two ends of the transverse tube is fastened to one of the two second rockers on a connecting line between the second joint and the third joint of the four-bar linkage.

12. The vehicle seat as claimed in one of claim 1, wherein the two ends of the transverse tube are respectively welded directly to one of the two second rockers.

13. The vehicle seat as claimed in claim 1, wherein the transverse tube has a circular cross section.

14. The vehicle seat as claimed in claim 1, further comprising:
a seat cushion part; and
a third rocker attached in an articulated manner to the substructure in a front region of the substructure by means of a lower joint and the third rocker is connected in an articulated manner to the seat cushion part by means of an upper joint.

15. The vehicle seat as claimed in claim 14, wherein the seat cushion part is lockable to the first rocker in a seat position by means of a locking device.

* * * * *